(12) United States Patent
Uysal et al.

(10) Patent No.: US 10,204,519 B2
(45) Date of Patent: Feb. 12, 2019

(54) COMMUNICATION BETWEEN VEHICLES OF A PLATOON

(71) Applicants: Özyeğin Universitesi, Istanbul (TR); Kadir Has Universitesi, Istanbul (TR)

(72) Inventors: Murat Uysal, Istanbul (TR); Serhat Erküçük, Istanbul (TR); Ömer Narmanlıoğlu, Istanbul (TR)

(73) Assignees: OZYEGIN UNIVERSITESI, Istanbul (TR); KADIR HAS UNIVERSITESI, Istanbul (TR)

( * ) Notice: Subject to any disclaimer, the term of this patent is extended or adjusted under 35 U.S.C. 154(b) by 0 days.

(21) Appl. No.: 14/902,235

(22) PCT Filed: Dec. 25, 2015

(86) PCT No.: PCT/TR2015/050266
§ 371 (c)(1),
(2) Date: Dec. 30, 2015

(87) PCT Pub. No.: WO2017/111717
PCT Pub. Date: Jun. 29, 2017

(65) Prior Publication Data
US 2017/0186327 A1 Jun. 29, 2017

(51) Int. Cl.
*G08G 1/00* (2006.01)
*G01S 13/93* (2006.01)
(Continued)

(52) U.S. Cl.
CPC .............. *G08G 1/22* (2013.01); *B60Q 1/00* (2013.01); *G01S 13/931* (2013.01); *G08G 1/161* (2013.01);
(Continued)

(58) Field of Classification Search
CPC ..... B60W 2550/302; B60W 2550/304; B60W 2550/306; B60W 2550/308; G01S 13/931;
(Continued)

(56) References Cited

U.S. PATENT DOCUMENTS 5,680,122 A 10/1997 Mio
6,032,097 A 2/2000 Iihoshi et al.
(Continued)

FOREIGN PATENT DOCUMENTS

EP 2 458 100 A1 5/2012
JP 11321380 A * 11/1999
(Continued)

OTHER PUBLICATIONS

Abualhoul, et al. "Enhancing the Field of View Limitation of Visible Light Communication-based Platoon", IEEE Intl. Symp. Wireless Vehicular Commun., pp. 1-5, 2014.
(Continued)

*Primary Examiner* — Jerrah Edwards
(74) *Attorney, Agent, or Firm* — Birch, Stewart, Kolasch & Birch, LLP

(57) ABSTRACT

A system and method are provided for communication between vehicles within a platoon of vehicles. In one embodiment, each vehicle is equipped with forward and backward directed optical emitters and receivers in operable communication with a controller. In an initialization phase, each vehicle determines its position within the platoon and the identification of all vehicles of the platoon. In a data transmission phase, each vehicle takes part in a token-based data transmission.

19 Claims, 7 Drawing Sheets

(51) Int. Cl.
*H04L 12/58* (2006.01)
*G08G 1/16* (2006.01)
*B60Q 1/00* (2006.01)
*H04B 10/112* (2013.01)
*H04B 10/114* (2013.01)
*H04B 10/116* (2013.01)

(52) U.S. Cl.
CPC ....... *H04B 10/116* (2013.01); *H04B 10/1125* (2013.01); *H04B 10/1129* (2013.01); *H04B 10/1149* (2013.01); *H04L 51/20* (2013.01); *B60W 2550/302* (2013.01); *B60W 2550/304* (2013.01); *B60W 2550/306* (2013.01); *B60W 2550/308* (2013.01)

(58) Field of Classification Search
CPC ...... G08G 1/161; G08G 1/22; H04B 10/1125; H04B 10/1129; H04B 10/1149; H04B 10/116; H04L 51/20
See application file for complete search history.

(56) References Cited

U.S. PATENT DOCUMENTS

| | | | |
|---|---|---|---|
| 7,006,465 | B2 | 2/2006 | Toshimitsu et al. |
| 7,973,674 | B2 * | 7/2011 | Bell ............... G08G 1/161 340/435 |
| 8,332,138 | B2 | 12/2012 | Suganuma et al. |
| 8,334,901 | B1 | 12/2012 | Ganick et al. |
| 8,352,111 | B2 | 1/2013 | Mudalige |
| 8,526,825 | B2 | 9/2013 | Yamada et al. |
| 8,548,647 | B2 | 10/2013 | Nemoto |
| 8,681,017 | B2 | 3/2014 | Lee et al. |
| 8,762,042 | B2 * | 6/2014 | Funabashi ............ G06F 17/00 340/903 |
| 8,874,477 | B2 * | 10/2014 | Hoffberg ............ G06Q 10/0631 705/37 |
| 9,245,446 | B2 * | 1/2016 | Chen ................ G08G 1/163 |
| 2004/0001019 | A1 * | 1/2004 | Nakazawa ............ G01S 13/87 342/70 |
| 2007/0087756 | A1 * | 4/2007 | Hoffberg ............ G06Q 10/0631 455/450 |
| 2007/0242339 | A1 | 10/2007 | Bradley |
| 2010/0045488 | A1 * | 2/2010 | Bell .................. G08G 1/161 340/988 |
| 2010/0256852 | A1 | 10/2010 | Mudalige |
| 2011/0176803 | A1 | 7/2011 | Song et al. |
| 2012/0327840 | A1 * | 12/2012 | Chen ................ G08G 1/163 370/315 |
| 2013/0018558 | A1 | 1/2013 | Ahn |
| 2013/0236183 | A1 | 9/2013 | Chao et al. |
| 2013/0261948 | A1 * | 10/2013 | Funabashi ............ G06F 17/00 701/300 |
| 2013/0343768 | A1 | 12/2013 | Jang et al. |
| 2014/0010540 | A1 | 1/2014 | Jeong et al. |
| 2014/0019031 | A1 | 1/2014 | Solyom et al. |
| 2014/0064740 | A1 | 3/2014 | Lee et al. |
| 2014/0105607 | A1 | 4/2014 | Castor et al. |
| 2014/0107867 | A1 | 4/2014 | Yamashiro |
| 2014/0172265 | A1 | 6/2014 | Funabashi |
| 2014/0222322 | A1 | 8/2014 | Durekovic et al. |
| 2014/0316865 | A1 | 10/2014 | Okamoto |
| 2015/0120181 | A1 | 4/2015 | Puhler et al. |

FOREIGN PATENT DOCUMENTS

| | | |
|---|---|---|
| JP | 2013-073361 A | 4/2013 |
| JP | 2014-130409 A | 7/2014 |
| WO | WO 2013/111961 A1 | 8/2013 |
| WO | WO 2014/137270 A1 | 9/2014 |

OTHER PUBLICATIONS

Abualhoul, et al. "Platooning Control Using Visible Light Communications: A Feasibility Study", IEEE Intl. Conf. Intelligent Transport. Syst., pp. 1535-1540, 2013.

http://www.theengineer.co.uk/in-depth/the-big-story/light-reading-visible-light-communications/1007419.ar "Light reading: visible light communications", The Engineer, Feb. 14, 2011.

Huang, et al. "Hybrid Radio and Visible Light Communications in Inter-Vehicle Communication", Applied Mechanics and Materials, pp. 1166-1172, 2014.

Ishihara, et al., "Secure Autonomous Platooning with Hybrid Vehicular Communication", ACM Hot Mobile, pp. 1, 2015.

Kim, et al., "Outdoor Visible Light Communication for Inter-Vehicle Communication Using Controller Area Network" 4th Intl. Conf. Commun. and Electron., pp. 31-34, 2012.

\* cited by examiner

COMMUNICATION BETWEEN VEHICLES OF A PLATOON

TECHNICAL FIELD

The present disclosure relates to the field of data communication between vehicles in a platoon. In particular, systems and methods are provided that relate to optical data transmission between vehicles in a platoon, using visible light communication (VLC) in one example.

BACKGROUND

At present, the most common communication systems are radio frequency (RF) based systems. That is why RF systems are also commonly used in vehicle-to-vehicle communication. Such vehicle-to-vehicle communication is used between two vehicles or also in vehicle groups sometimes called a "platoon" or "convoy". In platoon communications, in general, there is a team leader, and other vehicles follow the team leader. Communication between the vehicles in a platoon may be required for platoons formed by commercial vehicles, civil vehicles, military vehicles, etc. that follow each other. A large problem faced by RF techniques used in this type of communication is that purposeful or purposeless RF signals coming from outside the platoon may affect and/or distort intra-platoon communications. This in turn creates problems both in terms of security and reliability.

Line-of-Sight (LOS) communication systems that provide a directional beam pattern are suitable to solve this security problem. In particular, visible light communication (VLC) has emerged as an alternative and/or complementary to RF based communication solutions. In contrast to RF, which uses frequency bands up to 300 GHz, VLC uses 380-790 THz bands.

There are some important advantages of using optical communication systems like VLC instead of RF in platoons. By use of such optical communication systems in a platoon, security and reliability problems of RF signals may be overcome because the VLC signal is not easily disturbed from outside due to its short transmission range and line-of-sight nature. In such systems, a receiver and a transmitter that "see" each other directly or angularly may communicate without being exposed to an external effect and without being perceived by the receiver of a third party. Non-successive vehicles may communicate by multi-hop communications. A VLC-based platoon is more advantageous than a RF-based platoon in these respects.

Accordingly, inter-vehicle communication is a promising area in which VLC can be applied. In particular, data transmitted from front and rear headlights of vehicles can be received by other vehicles via photodetectors. Prior publications include academic studies as to which type of communication may in general be established physically between two vehicles (modulation type, light beam angle, environmental effects, etc.). Likewise, there are patents or patent applications on inter-vehicle VLC based communications. However, these studies, patents, and applications are generally directed to communication between two vehicles and are not suited for robust intra-platoon communication between multiple vehicles which may or may not be linear and/or successive (i.e., consecutive).

Thus, there is a need for a robust, reliable, and secure communication system and method between commercial, civil and/or military vehicles in a platoon that allows each vehicle to communicate with any other vehicle in the platoon.

SUMMARY

As previously mentioned, using RF techniques in platoon communication may lead to security and reliability problems. Existing alternatives such as VLC technology are more reliable, but are either limited to the communication between successive or neighboring vehicles or do not provide an easy method of communication between any two or more vehicles in a platoon.

The present invention addresses these problems by providing a new system and method of communication between vehicles in a platoon, wherein each vehicle is able to communicate with any other vehicle in the platoon using an inherently physically secure (i.e., signal interception requires physical contact and blocking) multi-hop communication method using optical radiation (visible, infrared or ultraviolet) signal transmission.

In accordance with an embodiment of the present invention, a communication system for enabling communication between vehicles in a platoon is presented. The communication system includes a first emitter and a first receiver, configured to be directed in a forward direction of a vehicle, and a second emitter and a second receiver, configured to be directed in a backward direction of the vehicle. The communication system further includes a controller in communication with the emitters and the receivers. The controller is configured to, during an initialization phase, determine a position of the vehicle within the platoon and the identity of each vehicle in the platoon, based on signals detected by the first and/or second receivers. The controller is further configured to, during a data transmission phase, participate in a token-based data transmission by evaluating a signal received by one of the first or second receivers and causing the emission of a signal either by the corresponding one of the first or second emitters that received the signal should the vehicle be the first or last vehicle in the platoon, or by the other one of the first or second emitters should the vehicle not be the first or last vehicle in the platoon.

In accordance with another embodiment of the present invention, a method of communication between vehicles in a platoon is presented. The method of communication includes providing a first emitter and a first receiver directed in the forward direction of a vehicle, and providing a second emitter and a second receiver directed in the backward direction of the vehicle. The method further includes, during an initialization phase, determining a position of the vehicle within the platoon and the identity of all vehicles in the platoon, based on signals detected by the first and/or second receivers. The method further includes, during a data transmission phase, participating in a token-based data transmission by evaluating a signal received by one of the first or second receivers and causing the emission of a signal either by the corresponding one of the first or second emitters that received the signal should the determined position of the vehicle be the first or last vehicle in the platoon, or by the other one of the first or second emitters should the determined position of the vehicle not be the first or last vehicle in the platoon.

DESCRIPTION OF THE FIGURES

Systems and methods for robust and secure internal platoon communication according to the invention and some particular embodiments thereof will be described with reference to the following figures. These and other features, aspects, and advantages of the present invention will become better understood when the following detailed description is read with reference to the accompanying drawings in which like characters represent like parts throughout the drawings. Unless noted, the drawings may not be drawn to scale.

DESCRIPTION OF EMBODIMENTS

Figure 1A:
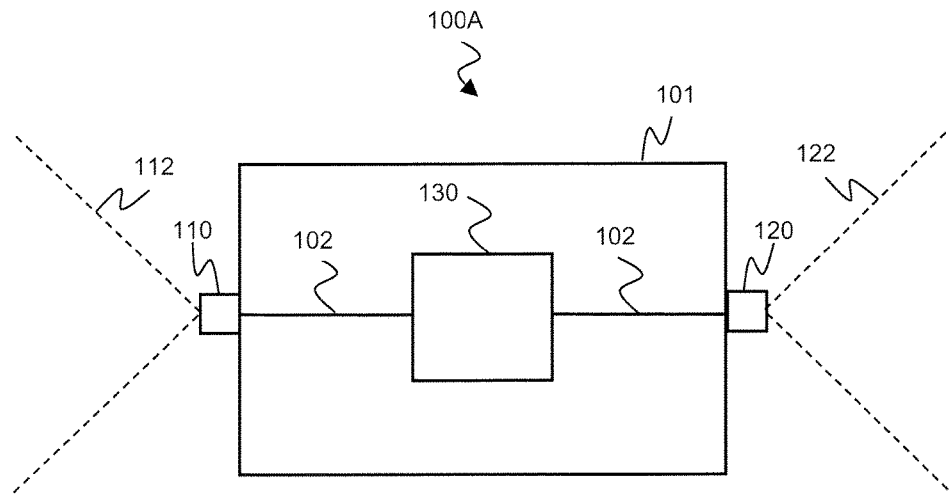
FIGS. 1A and 1B show general configurations of a communication system according to embodiments of the invention.

According to a general embodiment of the invention, a communication system and method for enabling communication between vehicles is provided. The vehicle may be one of various moving devices, whether the device moves on land, in the air, and/or on water. In particular, the invention may be realized in a platoon of land vehicles such as cars, trucks, and/or tanks, or in a platoon of planes and/or helicopters, or in a platoon of water vehicles such as boats. The vehicles can be commercial, scientific, civil and/or military vehicles for example. The vehicle is part of a platoon, convoy, or group of vehicles. Although the invention offers particular benefit for a platoon of three or more vehicles, the invention shall also encompass the case of two vehicles, for which the presented communication will also work.

According to a general embodiment of the invention, a communication system for enabling communication includes a first emitter that emits a signal in a forward direction (e.g., a direction from the back of the vehicle toward the front of the vehicle) and a second emitter that emits a signal in a backward direction (e.g., a direction from the front of the vehicle toward the back of the vehicle).

The signal that is emitted and/or received is an optical signal for optical communication. In contrast to the RF radiation used in the prior art, the signal according to the invention is an optical radiation (visible, infrared or ultraviolet) signal, which will only be receivable within the line of sight of emitters and receivers. Due to this property, such signals are advantageously hard to disturb by intentional or non-intentional signals from outside the platoon and offer physically secure (i.e., signal interception requires physical contact and blocking) and reliable data transmission and reception.

The signal may be transmitted by radiation under a certain solid angle, which is large enough to cover or mainly cover the possible locations of the preceding or following vehicle in the platoon. The signal may include different types of optical communication signals such as infrared, visible light or ultraviolet signals. Of particular advantage is visible light communication because existing vehicle lights may be used as emitters. Distant or non-successive (non-consecutive) vehicles are reached by multi-hop communication, meaning that the signal will hop from vehicle to another vehicle along the row of successive vehicles in the platoon in order to reach vehicles that are not direct neighbors.

According to a general embodiment of the invention, a communication system for enabling communication further includes a first receiver and a second receiver, which are directed in the forward and backward directions of the vehicle, respectively, to receive a signal emitted by emitters of the preceding or following vehicle in the platoon.

Optionally, more than one first and second emitter and/or more than one first and second receiver may be used. In particular embodiments, one emitter and one receiver may be integrated in each of two headlights and two backlights of a vehicle. The use of more than one emitter and/or receiver offers the additional advantage of covering a broader area in which the signal may be received. As a consequence, communication is possible for greater positional or angular displacements between consecutive vehicles. This advantage is enhanced as the number of emitters/receivers is increased.

According to a general embodiment of the invention, a communication system for enabling communication includes a controller connected to the emitters and receivers for generating and processing signals which are emitted and received. The controller may be separate or part of an electronic control unit of the vehicle. In one example, the controller may include a micro-processor, a general purpose integrated circuit, an application specific integrated circuit (ASIC), a logic processor, and/or a signal generator and processor. In yet another example, the controller may include a specifically programmed computer with a processor and memory. During operation, the controller controls the generation and transmission of signals and the processing of received signals.

The controller is in communication with the emitter(s) and receiver(s) and is configured or programmed to control the emitter(s) and receiver(s) to enable the communication between the vehicles as further described herein. In order to enable communication between any two vehicles in the platoon, each vehicle initially knows its own identification. Optionally, each vehicle may initially know the identification of other vehicles or learn the identification and data of other vehicles. In addition, the vehicle learns whether it is positioned at the front of the platoon (e.g., the first or lead vehicle), at the back of the platoon (e.g., the last vehicle or rear guard), or somewhere in between (e.g., a middle vehicle). In particular embodiments, the controller may learn the relative position of a vehicle (e.g., what vehicle is in front and behind, if any) and/or the absolute position of all vehicles (e.g., sequence or order of all vehicles) in the platoon. Learning the position of all vehicles in the platoon has the additional advantage that long circulation times can be avoided by sending data to another vehicle in an efficient direction (e.g., a message to a vehicle may be sent in an alternative or switched direction, thereby avoiding unnecessary circulation through other vehicles). It also has the additional advantage that the sequence of vehicles is still known whenever one vehicle is leaving the platoon, and can be used in identifying a vehicle that is missing or has left the platoon.

According to a general embodiment of the invention, a communication method for enabling communication between vehicles of a platoon includes a start phase, during which vehicles in a platoon are started and emitters, receivers, and controllers may be checked for proper operation. In addition, the controller may reset all previously stored information and become ready for the initialization phase.

The start phase is followed by an initialization phase during which a controller on a vehicle determines whether it is the first vehicle in the platoon, the last vehicle in the platoon, or not the first or last vehicle in the platoon, followed by a determination of the identity of each vehicle in the platoon. In particularly advantageous embodiments, each vehicle also learns the sequence of the vehicles in the platoon (e.g., from a received forward-travelling signal from the most rear vehicle in the platoon). In particular embodiments, the initialization phase could be used to pass other data about the platoon vehicles, such as priority information, rank information, and the like. Such information could be of particular relevance in military platoons.

The initialization phase is followed by a data transmission phase, during which each vehicle participates in a token-based data transmission by evaluating a signal received by one of the first or second receivers, and by causing the emission of a signal either by the corresponding one of the first or second emitters should the vehicle be the first or last vehicle of the platoon, or by the other one of the first or second emitters should the vehicle not be the first or last vehicle of the platoon. Once a sequence of vehicle identification data is known, data may be addressed to a desired recipient and transmitted in a secure and reliable manner.

Accordingly, an embodiment of the present invention is comprised of a system and method which discovers the position and identity of platoon vehicles and reports a sequence of vehicles, assuring efficient and effective data transmission through a token-based communication system and method. Another embodiment of the present invention is comprised of a system and method which assures a secure line-of-sight data transmission and reception by the use of optical communication signals and allows for communication among non-successive vehicles by a multi-hop communication system and method. Embodiments of the present invention thus enable each vehicle in a platoon to communicate with any other vehicle of the platoon.

Figure 1B:
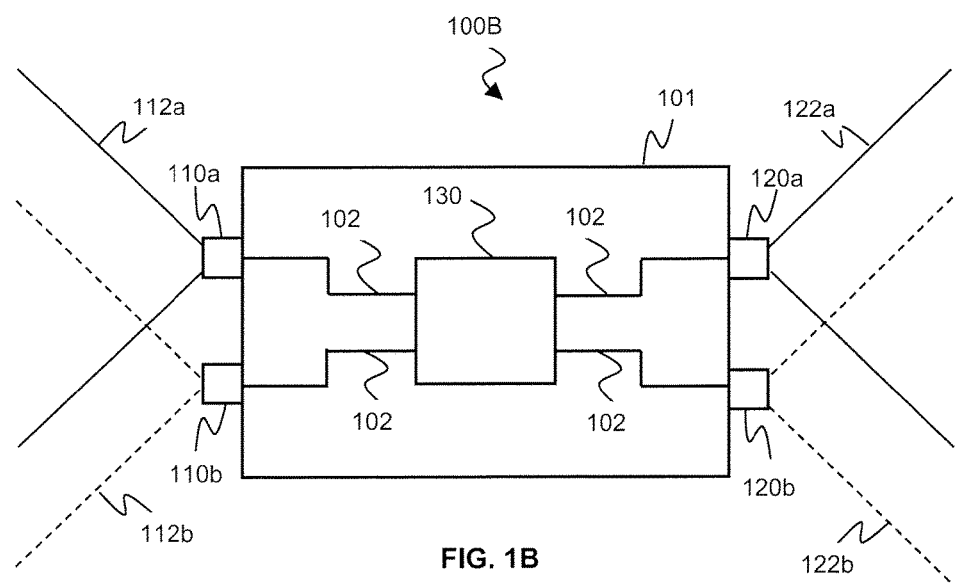

Referring now to the figures, FIGS. 1A and 1B illustrate general configurations of a communication system 100A and 100B, respectively, in accordance with embodiments of the present invention. Communication system 100A is installed on a vehicle 101, which can be one of various vehicles as previously noted above. The vehicle is part of a platoon, convoy, or group of vehicles. All vehicles in the platoon include the same or substantially similar communication system 100A. Communication system 100A further includes a first emitter/receiver 110 which is configured to emit a signal 112 in the forward direction and a second emitter/receiver 120 which is configured to emit a signal 122 in the backward direction. First emitter/receiver 110 and second emitter/receiver 120 are directed in the forward and backward direction of the vehicle, respectively, to receive the signal emitted by emitters of the preceding or following vehicle in the platoon. The emitters and receivers are connected to a controller 130, which can be a micro-processor or specifically programmed computer in one example. The controller 130 may be in communication with the emitters and receivers by an appropriate means, including but not limited to wireless, wireline, optical fiber cable, etc., or any suitable combination of the foregoing (shown by lines 102). The controller 130 is configured or programmed to control the emitters and receivers to enable communication between the vehicles of the platoon using methods as described herein. Controller 130 may be located in any of various applicable locations in or on the vehicle.

Communication system 100B is substantially similar to communication system 100A except system 100B includes a plurality of forward-directed emitter/receivers and a plurality of backward-directed emitters/receivers, in accordance with embodiments of the present invention. Communication system 100B is installed on a vehicle 101, which can be one of various vehicles as previously noted above. Communication system 100B further includes a first emitter/receiver 110a and a second emitter/receiver 110b which are configured to emit signals 112a and 112b, respectively, in the forward direction. Communication system 100B further includes a third emitter/receiver 120a and a fourth emitter/receiver 120b which are configured to emit signals 122a and 122b, respectively, in the backward direction. The use of more than one emitter and/or receiver offers the additional advantage of covering a broader area in which the signal may be received. As a consequence, communication is possible for greater positional or angular displacements between consecutive vehicles. This advantage is enhanced as the number of emitters/receivers is increased. Thus, additional numbers of emitters and receivers are within the scope of the present invention. Furthermore, although emitter/receiver pairs have been illustrated, emitters and receivers may be separately mounted on a vehicle within the scope of the present invention.

Figure 2:
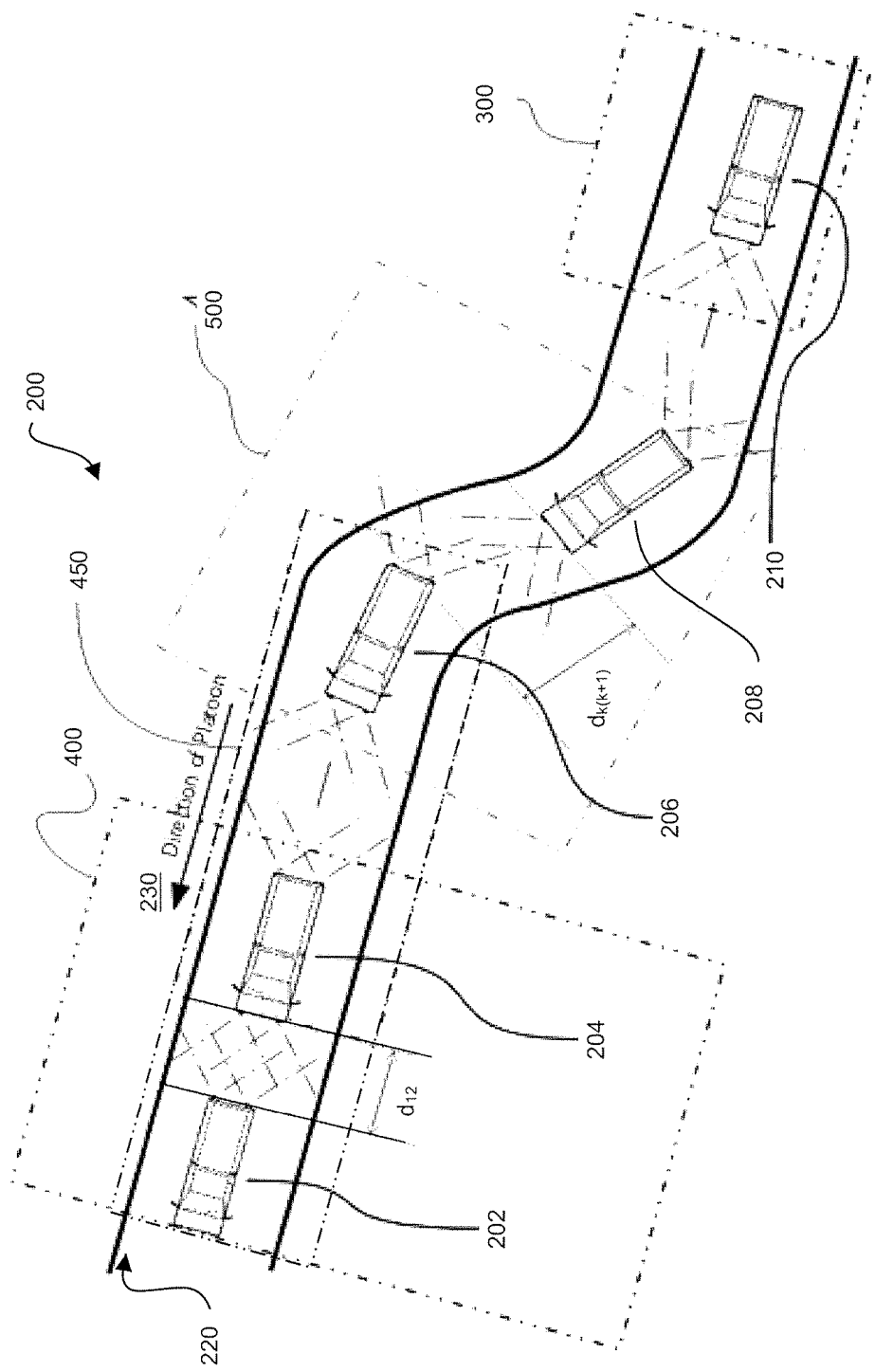
FIG. 2 shows a platoon of vehicles communicating by optical radiation according to an embodiment of the invention.

Referring now to FIG. 2, a platoon 200 of vehicles (e.g., automobiles) are illustrated according to an embodiment of the present invention. Platoon 200 includes vehicles 202, 204, 206, 208, and 210 traveling along a path 220 in a generally forward direction, as shown by an arrow 230. Vehicles 202 and 204 form a group of linear successive vehicles 400. Vehicles 202 and 206, for example, form a group of linear non-successive vehicles 450. Vehicles 206 and 208 form a group of non-linear successive vehicles 500. Each of the vehicles 202-210 are configured with a communication system 100A or 100B as illustrated in FIGS. 1A and 1B, respectively. In one example, a communication system 300 is shown and understood to include vehicle 210, emitters, receivers, and controller 130. A platoon may include a number N of successive vehicles, which communicate with each other using optical radiation, such as VLC in one example.

These vehicles with communication systems 100A or 100B including controllers 130 are the basic elements of platoon communication. In one embodiment, each of the vehicles initially only know their own ID, and do not even know their own position within the platoon. In other embodiments, each of the vehicles may initially know their own ID and also have other information about the other vehicles in the platoon.

The inventive method described more in detail herein enables the controllers 130 to learn whether the respective vehicle is the first or last vehicle in the platoon or neither of both. In a particular embodiment, each controller learns the position of its respective vehicle in the platoon and the positions of all other vehicles in the platoon (e.g., a relative position and/or the positional order or sequence of each of the platoon vehicles). After the positions of the vehicles are learned, the vehicles can communicate with each other as described herein. Accordingly, the vehicles can communicate with each other as linear successive vehicles 400, non-successive vehicles 450, or as non-linear successive vehicles 500. Non-successive vehicles (e.g., vehicles 202 and 206) can perform optical communication by using multi-hop communication methods as described herein, wherein a signal is delivered between the two non-successive vehicles (e.g., vehicles 202 and 206) by "hopping" from one vehicle to the respective successive vehicle in the platoon (e.g., hopping a signal from vehicle 202 to non-successive vehicle 206 using successive vehicle 204 therebetween).

Figure 3:
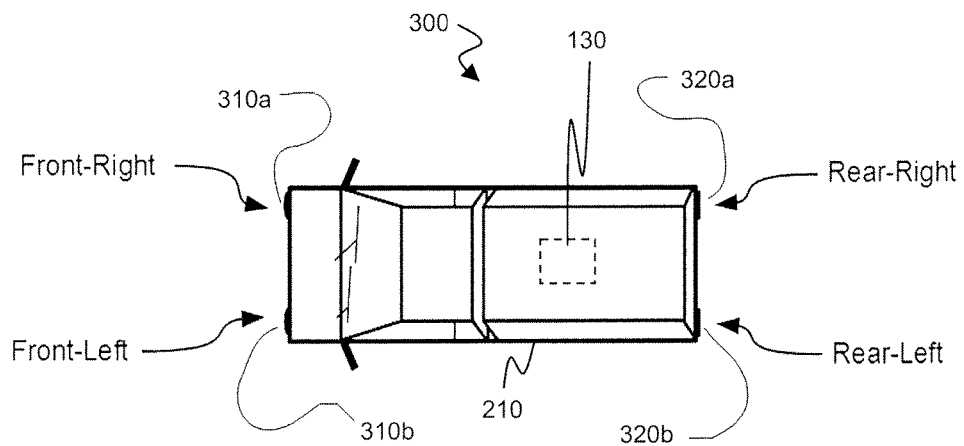
FIG. 3 shows one vehicle within the platoon of vehicles communicating by optical radiation according to an embodiment of the invention.

Referring now to FIG. 3, an optical (e.g., VLC-based) communication system 300 is shown including vehicle 210 with emitter/receiver units 310*a* and 310*b* directed toward a forward direction and emitter/receiver units 320*a* and 320*b* directed toward a backward direction. The emitter/receiver units are operably coupled to a controller 130. In this particular embodiment, each vehicle of the platoon is equipped with a total of 4 transceivers, one located in the front-right headlight, one in the front-left headlight, one in the rear-right headlight, and one in the rear-left headlight. The front headlights are equipped with optical communication transmitters (in one example, light emitting diodes, LEDs) ensuring forward data transmission, and with optical communication receivers (in one example, photodetectors) ensuring backward data reception, while the rear headlights are equipped with LEDs ensuring backward data transmission and with photodetectors ensuring forward data reception. All transceivers are connected to controller 130.

Figure 4:
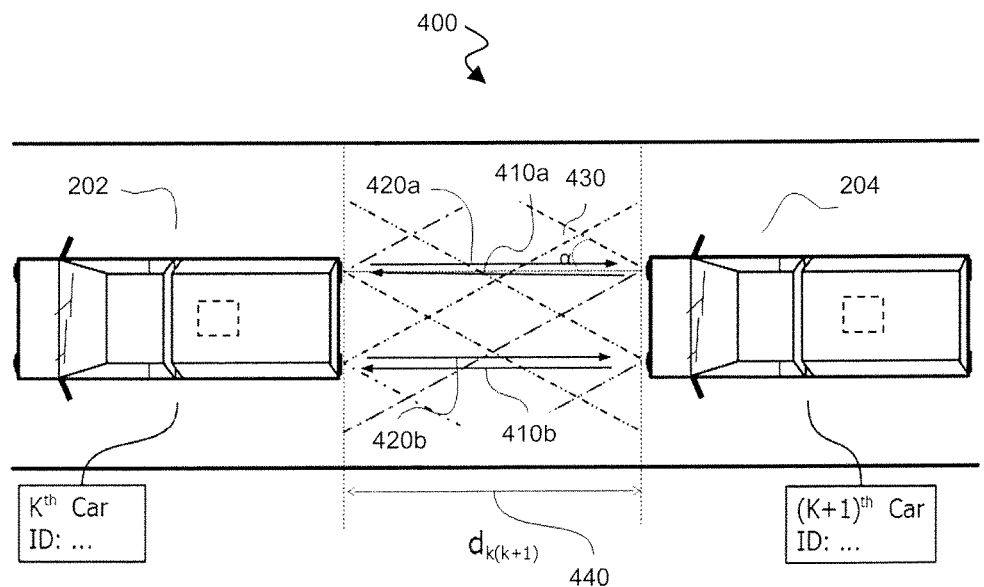
FIG. 4 shows the communication of linear successive vehicles by optical radiation according to an embodiment of the invention.

Referring now to FIG. 4, vehicles 202 and 204 illustrate a group of linear and successive vehicles 400 which can communicate by VLC in accordance with an embodiment of the present invention. Front vehicle 202 is in a kth position within the platoon, followed by a rear vehicle 204 at the (k+1)th position. The two respective emission and reception cones of the optical radiation are shown from the backside of the front vehicle 202 and from the frontside of the rear vehicle 204 by pairs of diverging dashed lines. In this structure, for the sake of a successful data transmission between linear aligned front vehicle 202 at a position k and rear vehicle 204 at rank (k+1), a maximum distance 440 between the vehicles is shown to be $d_{k(k+1)}$. The arrows 420*a* and 420*b* in the center of emission and reception cones indicate a data transmission directed along the arrow, and in one embodiment is a half duplex backward communication. Half duplex backward communication (as shown by arrows 420*a* and 420*b*) is used in data transmission of/from the front vehicle 202 to the rear vehicle 204, while half duplex forward communication (as shown by arrows 410*a* and 410*b*) in one embodiment is used in data transmission of/from the rear vehicle 204 to the front vehicle 202. The reason for the use of half duplex communication instead of full duplex communication is the use of a token-based data transmission in the platoon, which will be described in more detail further below.

In accordance with yet another embodiment, it is noted that the right and left front headlights may transmit the same data and that the right and left rear headlights may transmit the same data. Particularly in non-linear successive vehicles, the importance of transmission of the same information from both headlights will be shown and is apparent to have more reliable and successful data transmission and reception. However, right and left headlights need not always transmit the same data, and alternatively, may be controlled to transmit the same data or different data in certain conditions. Finally, light transmission and reception angle 430 is defined as α. The angle α is the angle of divergence of the light cone emitted by the LEDs—or the maximum transmission angle—measured with respect to the center axis of the light emission, which is parallel to the longitudinal axis of the vehicle, in one embodiment. The angle α is also the angle of divergence of the field of view of the photodetector—or the maximum angle of incidence that can be perceived by the photodetector—measured with respect to center axis of the field of view, which is parallel to the longitudinal axis of the vehicle, in one embodiment.

Figure 5:
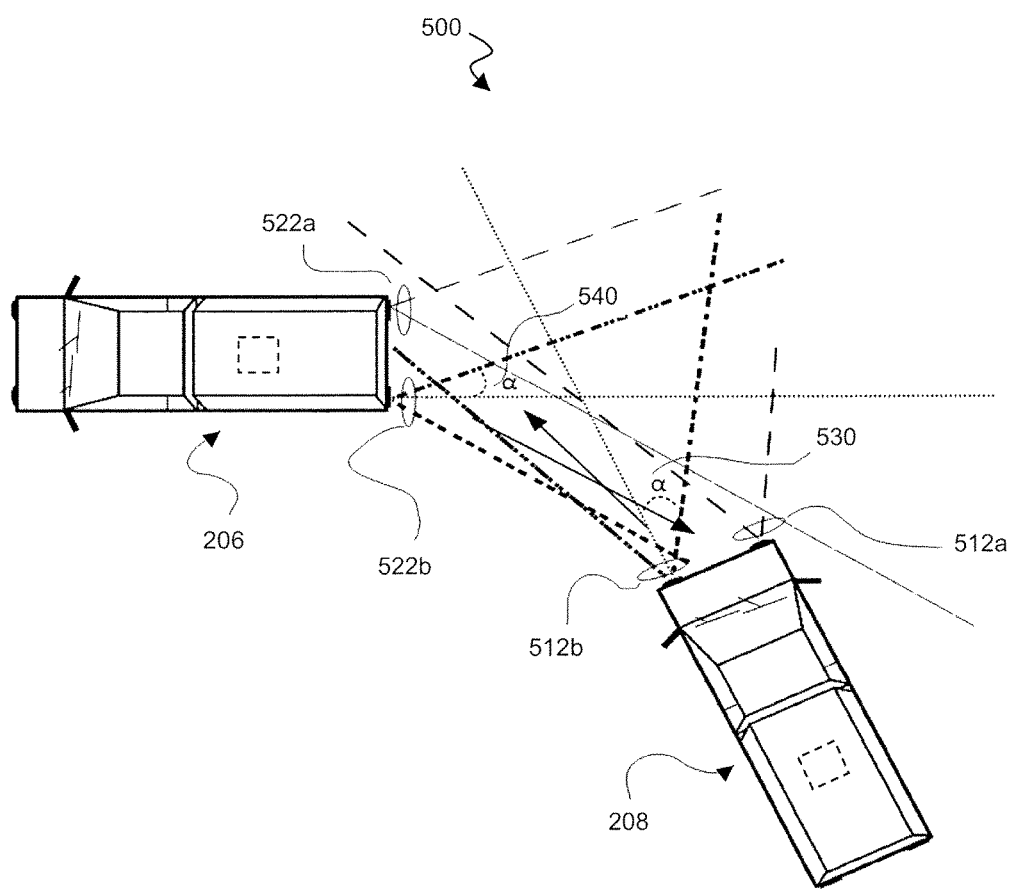
FIG. 5 shows the communication of non-linear successive vehicles by optical radiation according to an embodiment of the invention.

Referring now to FIG. 5, vehicles 206 and 208 illustrate a group of successive but non-linear vehicles 500 which can communicate by optical radiation (e.g., by VLC) in accordance with an embodiment of the present invention. In this structure, a data transmission from the front vehicle 206 to the rear vehicle 208 takes place, wherein the left front headlight 512*b* of the rear vehicle 208 lies outside of the emission and reception cone of the left backlight 522*b* of the front vehicle 206 (radiation cones are illustrated by pairs of diverging dashed lines). Also, the right front headlight 512*a* of the rear vehicle 208 lies outside of the emission and reception cone of the right backlight 522*a* of the front vehicle 206. In other words, left and right front headlights of the rear vehicle and respective left and right backlights of the front vehicle do not lie in each other's line of sight and do not see each other. The light beam emitted by the rear-right backlight 522*a* and the light beam emitted by the rear-left backlight 522*b* of the front vehicle 206 are expected to correspond to respective front-right headlight 512*a* and front-left headlight 512*b* of the rear vehicle 208. However, in a probable road bend, headlights and backlights of successive vehicles may lose their direct line of sight. Therefore, the light beam from rear left backlight 522*b* of front vehicle 206 will be perceived by the receiver of right front headlight 512*a*. Thus, transmission of the same data by both left and right headlights or by both left and right backlights advantageously provides for greater reliability and continuity of data transmission in non-linear successive systems.

Furthermore, the light transmission and reception angles 530 and 540 are each defined as α. The angle α is the angle of divergence of the light cone emitted by the LEDs—or the maximum transmission angle—measured with respect to the center axis of the light emission, which is parallel to the longitudinal axis of the vehicle, in one embodiment. The angle α is also the angle of divergence of the field of view of the photodetector—or the maximum angle of incidence that can be perceived by the photodetector—measured with respect to a center axis of the field of view, which is parallel to the longitudinal axis of the vehicle, in one embodiment. In alternative embodiments, the light transmission and reception angles need not be the same angle.

Figure 6:
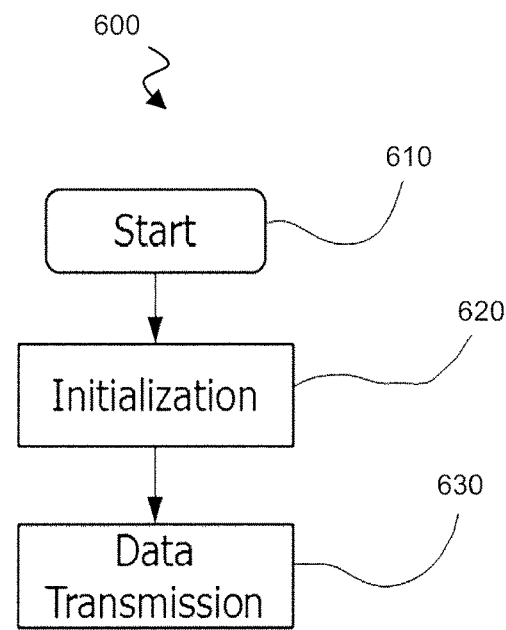
FIG. 6 shows basic method steps to realize a communication according to an embodiment of the invention.

Referring now to FIG. 6, a communication method 600 including a start phase 610, an initialization phase 620, and a data transmission phase 630, is illustrated according to an embodiment of the invention. Initially, a vehicle knows its own identification or ID (e.g., using the controller installed on the vehicle). The ID may be a unique digital code, carrying the identification and/or other characteristics of the vehicle and/or its occupants. The vehicle initially may not know the IDs of other vehicles of the platoon. The vehicle also may not initially know its own position within the platoon or the position and total number of other vehicles in the platoon. In one embodiment, the vehicle learns or discovers whether it is the first or last vehicle in the platoon, or neither of both. The vehicle also learns the IDs of the other vehicles in the platoon.

In order to learn or discover this information, the communication is initiated by a start phase 610, during which vehicles in a platoon are started and emitters, receivers, and controllers may be checked for proper operation. Start phase 610 may further include acquiring data on the other vehicles in the platoon, such as occupants and rank of occupants, and allowing the controller access to the data. Such data may be acquired by the controller using a variety of applicable means, such as by wirelessly connecting to a server, by accessing a portable memory device connected to the controller, or accessing data entered by a user.

The start phase 610 is followed by an initialization phase 620 during which a controller on a vehicle determines whether it is the first or last vehicle in the platoon or not. The vehicle then communicates its ID to the other vehicles in the platoon and determines the identities of all vehicles in the platoon. In particularly advantageous embodiments, the positions of all vehicles in the platoon may also be learned during this initializing phase 620.

After the initialization phase 620, each vehicle has learned all necessary information to start the data transmission phase 630. During the data transmission phase 630, data and signs of reception may be transmitted between successive and non-successive vehicles in the platoon. Through a token-based method as described herein, the vehicles continuously communicate with each other, and information is given as to whether transmitted data is received correctly or not. The phases 620 and 630 are described more in detail with respect to FIGS. 7-9.

Table 1 below indicates a data packet structure in accordance with an embodiment of the present invention. In the packet structure as shown in Table 1, a data packet structure applicable for optical communication within a platoon is presented. In one example, a classical packet structure used in networks may be utilized in the present methods for ease of adoption and compatibility. In accordance with one embodiment, the general structure of a data packet includes a Header, a Payload, and a Trailer. The Header includes Transmission Type data, Destination ID data, Source ID data, and Data Length data. In one example, the Transmission Type data may be 2 bits, the Destination ID data and Source ID data may each be [log$_2$N] bits, and the Data Length data may be 1-10 bits. The Payload includes Data of P bits, and the Trailer includes Error Correction data of T bits.

TABLE 1

| Full Packet Structure | | Length |
|---|---|---|
| Header | Transmission Type | 2 bits |
|  | Destination ID | [log$_2$ N] bits |
|  | Source ID | [log$_2$ N] bits |
|  | Data Length | {1-10} bits |
| Payload | Data | P bits |
| Trailer | Error Correction | T bits |

The first two bits of the Header indicate the transmission type, and in one embodiment the data packets are distinguished between four different transmission types, as shown in Table 2 below. The first transmission type is termed "Initialization" (00 bits), which is used to determine the IDs and positions of the vehicles during the start phase 610 and initialization phase 620. The second transmission type is termed "Control Signaling" (01 bits) and indicates a signal transmission wherein no data is transmitted. This transmission type is used during the data transmission phase 630. A third transmission type is termed "Data Transmission" (10 bits) and is used to actually transmit desired data between vehicles. A fourth transmission type is termed "ACK/NACK Transmission" and is used to deliver a sign of receipt or non-receipt of a data transmission. The third and fourth types of transmission are also used during the data transmission phase 630.

In the Initialization type, the packet length is not fixed. It will be described in further detail with respect to FIG. 8. In the Control Signaling type, only Transmission Type bits are transmitted, while in the Data Transmission type, all packet bits are transmitted. In the ACK/NACK Transmission type, only Header bits are transmitted. This will be described in further detail with respect to FIG. 9.

TABLE 2

| Transmission Types | | Used Packets Structure |
|---|---|---|
| 00 | Initialization | Not Fixed |
| 01 | Control Signaling | Transmission Type |
| 10 | Data Transmission | Full Packet |
| 11 | ACK/NACK Transmission | Full Header |

Figure 7:
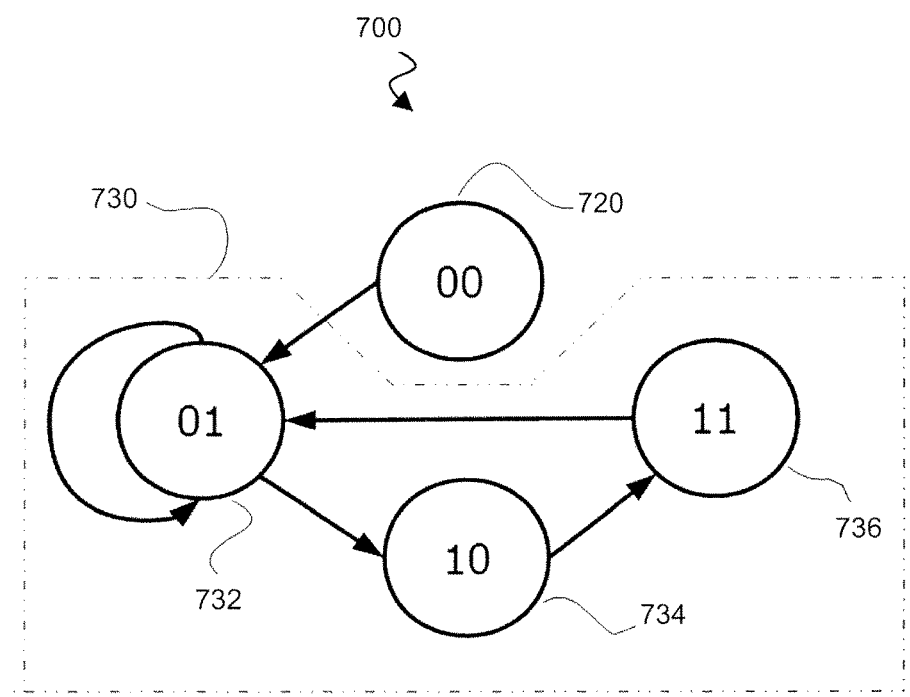
FIG. 7 shows a state-transition diagram between different transmission types in the communication according to an embodiment of the invention.

Referring now to FIG. 7, a state-transition diagram 700 between the four different transmission types described above is illustrated. The total number of transmission types is four, denoted by states having bits 00, 01, 10, and 11. The transmission types start with an Initialization state 720 which is at all times shown with 00 bits. This type is used during the start phase 610 and initialization phase 620, as will be explained further with regard to FIG. 8. The platoon communication system remains inactive until positions of all vehicles are determined and until all vehicles are informed about the positions in the initialization phase 620.

Subsequently, the data transmission phase 630 is started by entering Transmission states 730, which comprise the cycling of a control signaling token, a data transmission token, or an acknowledgement or no acknowledgement token as signs of receipt. This data transmission phase 630 is started by shifting from Initialization state 720 shown by 00 bits to a Control Signaling state 732 shown by 01 bits. This state remains if there is no vehicle intending to send a data packet in the platoon. If and when a vehicle intends to transmit data to another vehicle in the platoon, the process shifts to Data Transmission state 734 shown by 10 bits. After the data is transmitted, the vehicle receiving the data shifts the state of the system to the ACK/NACK Transmission state 736 shown by 11 bits, in order to send a sign of receipt/non-receipt to the vehicle sending the data. After the information of receipt/non-receipt, the process again shifts to the Control Signaling state 732, and this continues cyclically.

Figure 8:
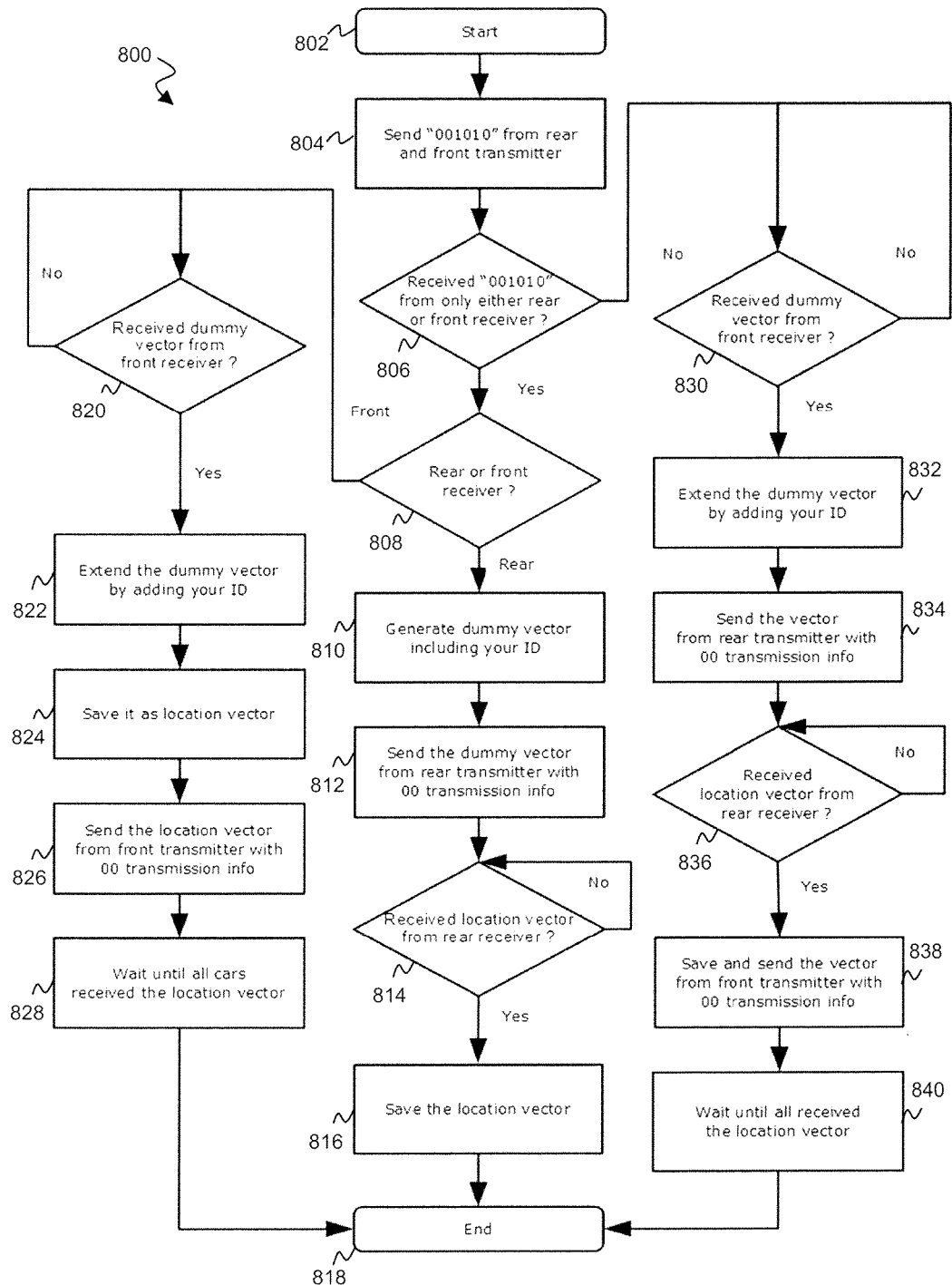
FIG. 8 shows a flow diagram of an initialization phase of a communication method according to an embodiment of the invention.

Referring now to FIG. 8, a flowchart is shown illustrating a method of initialization 800 for use during the initialization phase 620 and to be carried out by a controller in accordance with an embodiment of the present invention. Method of initialization 800 includes a start block 802 which then moves to block 804 in which each platoon vehicle sends a data signal from its front and rear transmitters in the forward and backward direction, respectively. The data signal may have the binary form of "001010" in one example. The transmitters and receivers may be integrated in the headlights and backlights of the vehicle.

Next, at decision block 806, a decision is made whether the data signal is received from only either the rear or front receiver, as vehicles receive this data signal through both their front and rear receivers, except for front receivers of the foremost (first) vehicle and rear receivers of the rearmost (last) vehicle. If no signal is received from the receiver pointing in the forward direction, the controller on the vehicle learns that it is the first vehicle in the platoon. If no signal is received from the receiver pointing in the backward direction, the controller on the vehicle learns that it is the last vehicle in the platoon. If signals are received from the receivers pointing in the forward direction and in the backward direction, the controller on the vehicle learns that it is neither the first nor the last vehicle in the platoon. Thus, the vehicle in the first position and the vehicle in the last position know their exact position. If the decision at decision block 806 is no (i.e., signal received from both front and rear receivers), method 800 moves to decision block 830, indicating a vehicle which is neither first nor last in the platoon (in other words, in the middle of the platoon). If the decision is yes (i.e., signal received from only the front or rear receiver), method 800 moves to decision block 808.

At decision block 808, a decision is made whether the data signal is received from only the rear receiver or only the front receiver. If the data signal is received only from the front receiver, method 800 moves to decision block 820, indicating the rearmost or last vehicle of the platoon. If the data signal is received only from the rear receiver, method 800 moves to block 810, indicating the foremost or first vehicle of the platoon.

At block 810, a dummy vector including the particular vehicle ID is generated by the first platoon vehicle. At block 812, the dummy vector is transmitted backwards from a rear transmitter with 00 transmission data. All vehicles, other than the vehicle ranking first, remain silent. The vehicle that identified itself to be the first vehicle in the platoon starts the initializing phase by generating a dummy signal that comprises its identification. The first vehicle emits the generated dummy signal in the backward direction using the backward directed emitter. In particular, the two emitters in the two backlights may be used. The second vehicle receives this dummy signal from its forward pointing receiver(s), adds its own identification to the signal which already comprises the ID of the first vehicle and emits this extended dummy signal in the backward direction using its two emitters in the two backlights. This transmission continues until the last vehicle.

When the dummy signal reaches the last vehicle, it contains the identifications of all vehicles in the platoon. The last vehicle stores this information, which will allow it to generate messages addressed to any of the vehicles in the platoon. Upon reception of the signal, the last vehicle also generates a signal by adding its identification to the received signal and emits this signal as a platoon location vector including all vehicle identifications, back in the forward direction (the reverse direction). Each vehicle forwards the platoon location vector signal that is received from the backward direction in the forward direction unchanged. Controllers in each vehicle use the signal to learn the identifications of all vehicles in the platoon in order to be able to particularly address each vehicle during a later communication phase. As soon as the first vehicle receives the location vector signal from the backward direction, the initialization phase is finished.

The signal being reversed by the last vehicle contains the sequence of all vehicle IDs in the right order. Hence, in particularly advantageous embodiments, the vehicles may use this information to also learn not only how many and which vehicles are in the platoon, but also the position of each vehicle within the platoon.

At decision block 814, a decision is made by the first vehicle whether a platoon location vector indicating a sequence of vehicle IDs in the platoon has been received. If the decision is no, method 800 continues to check for the reception of a platoon location vector by cycling back to decision block 814. If the decision is yes, method 800 moves to block 816, where the platoon location vector is saved. Method 800 then moves to end block 818 where the initialization phase ends.

At decision block 820, a decision is made by the controller of the rearmost or last vehicle of the platoon, whether a dummy vector has been received from the front receiver. If the decision is no, method 800 continues to check for the reception of a dummy vector from the front receiver by cycling back to decision block 820. If the decision is yes, method 800 moves to block 822, where the received dummy vector is extended by adding the last vehicle ID.

Next, at block 824, the extended dummy vector from block 822 is saved as a platoon location vector. Next, at block 826, the location vector is sent from front transmitter with 00 transmission data. Next, at block 828, method 800 waits until all vehicles in the platoon have received the location vector, and then moves to end block 818 where the initialization phase ends.

At decision block 830, a decision is made by the controller of a non-first or non-last vehicle of the platoon (a middle vehicle), whether a dummy vector has been received from the front receiver. If the decision is no, method 800 continues to check for the reception of a dummy vector from the front receiver by cycling back to decision block 830. If the decision is yes, method 800 moves to block 832, where the received dummy vector is extended by adding the middle vehicle ID.

Next, at block 834, the extended dummy vector from block 832 is sent from a rear transmitter with 00 transmission data.

Next, at decision block 836, a decision is made whether a platoon location vector has been received from a rear receiver. If the decision is no, method 800 continues to check for the reception of a location vector by cycling back to decision block 836. If the decision is yes, method 800 moves to block 838, where the location vector is saved and sent through a front transmitter with 00 transmission data.

Next, at block 840, method 800 waits until all vehicles in the platoon have received the location vector, and then moves to end block 818 where the initialization phase ends.

It is noted that in accordance with an embodiment, the location vector data may be utilized in various ways and transferred to the other vehicles of the platoon from the last vehicle by other applicable means. Furthermore, it is noted that in some embodiments, the initialization phase may be repeated, for example automatically at specified time intervals or upon a user initiated action.

Figure 9:
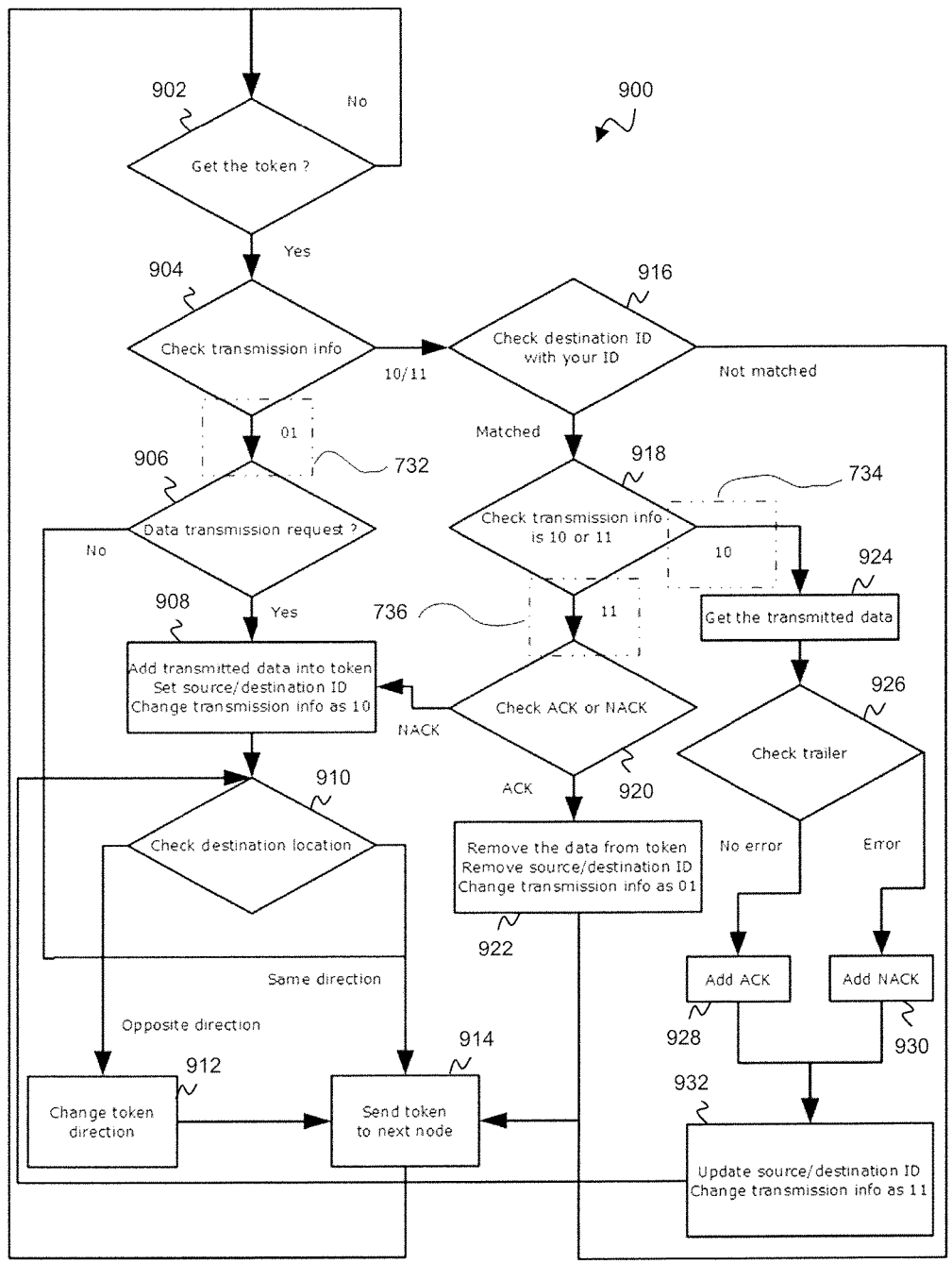
FIG. 9 shows a flow diagram of a data transmission phase in a communication method according to an embodiment of the invention.

Referring now to FIG. 9, a flowchart is shown illustrating a method of data transmission 900 for use during the data transmission phase 630 and to be carried out by a controller in accordance with an embodiment of the present invention. During the data transmission phase 630, each vehicle in the platoon participates in a token-based data transmission by evaluating a signal received by one of the first or second receivers, and by causing the emission of a signal either by the corresponding one of the first or second emitters should the vehicle be the first or last vehicle of the platoon, or by the other one of the first or second emitters should the vehicle not be the first or last vehicle of the platoon.

In particular, the first vehicle starts the token-based data transmission phase after it has learned the identifications of all vehicles in the initialization phase. In a preferred embodiment, also the position of each vehicle has been learned. The data transmission phase is started by the first vehicle controller changing the transmission type in the Header of the packet structure from 00 to 01, and shifts to a Control Signaling state 732. Then, the controller transmits the token together with the packet of 2 bits (01, i.e. control signaling packet) to the vehicle at its rear.

This control signal consisting of the 2-bit packet and a token will be transmitted continuously from vehicle to vehicle with information that there is no data being transmitted. The purpose of this signal is to give each vehicle the chance to transmit data when desired in an ordered manner. Upon reception of a control signal, a vehicle merely forwards this signal unchanged if no data transmission is desired. The last vehicle will invert the direction of the signal and so does the first vehicle such that the control signal circulates cyclically.

Each vehicle controller starts the method of data transmission with the decision block 902, where it continuously waits for the token. Once receiving the token, the vehicle controller checks the transmission bits in decision block 904. At the end of the initialization phase, the data transmission phase 630 will start with the control signal (i.e., header bits 01). Therefore, initially for any vehicle the decision block 906 will be executed. However, once a vehicle starts data transmission or acknowledges the data transmission, the decision of block 904 may lead to decision block 916.

Starting with the initial case of no data transmission, if the recipient of a control signal desires to communicate and to transmit data to another vehicle (decision block 906), it changes the signal to a data-transmission signal including its own identification and the identification of the desired recipient. The transmission type is changed to the data-transmission state by shifting the header from 01 to 10 bits (block 908). Apart from the Header, the IDs of the sender and the recipient and the data to be transmitted, the controller also generates error correction bits which are added to the signal.

The signal is sent by maintaining the circulation direction. However, in a preferred embodiment in which each vehicle has learned the position of each other vehicle of the platoon, the emission may be directed directly towards the recipient at decision block 910, by either continuing in the circulation direction (the next node) (block 914) or by changing the token direction (block 912) such that data transmission may be more timely and efficient.

In successive data transmission, the vehicle directly in the front or at the back of the sending vehicle is the recipient. In the non-successive data transmission, the data-transmission-signal is transmitted by other vehicles to the desired recipient via multi-hop communication. These other vehicles receiving this data transmission signal but not being the desired recipient merely forward the data-transmission signal (decision blocks 902 and 904). In a preferred embodiment in which each vehicle has learned the position of each other vehicle of the platoon, the signal may be redirected into the proper direction towards the recipient.

The vehicle which is the desired recipient checks transmission data at decision block 904 for bits 10 or 11, and then checks the destination ID with the vehicle ID at decision block 916. If there is a match, method 900 moves to decision block 918. If there is not a match, method 900 moves to block 914 and the token is sent to a next node.

At decision block 918, transmission data is checked for bits 10 or 11. If bits 10 are found, the transmitted data is obtained at block 924. Then at decision block 926, the controller checks if the signal is received properly or not by checking the error correction bits of the packet. A bit sequence indicating a proper or positive data-transmission receipt (ACK transmission at block 928) or a wrong or negative data-transmission receipt (NACK transmission at block 930) is generated. The signal further comprises the ID of the original sender, to which the signal is now addressed, and the ID of the recipient. It then generates a receipt signal by changing the transmission type from data-transmission to ACK/NACK transmission state (the Header is changed from 10 to 11) (block 932). The emission maintains the circulation direction. However, in a preferred embodiment, in which the vehicles know the position of all other vehicles, the emission may be directed in the direction of the original sender.

Again, this signal will merely be forwarded by all vehicles which are not the addressed sender, which is the vehicle presently holding the token (blocks 902 and 904). Subsequently, the sign of receipt or non-receipt is received by the vehicle holding the token.

At decision block 918, transmission data is checked for bits 10 or 11. If bits 11 are found, ACK or NACK is checked at decision block 920. If a NACK message is received, the data transmission is repeated as summarized hereinabove by moving to block 908. If an ACK message is received, the vehicle sending the data learns that its message has been received correctly, changes the transmission type in the Header from 11 to 01, shifts to the Control Signaling state (block 922), and releases the token (block 914). When another vehicle wishes to transmit a data, the data transmission and delivery of a sign of receipt approach described hereinabove is continued cyclically.

Embodiments of the present invention may be embodied as a system, method, or computer program product (e.g., embodiments directed toward a communication system, a communication method, and/or a communication controller). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". For example, a communication controller in operable combination with transceivers, may be embodied in a software and hardware system that can be operably mounted to a vehicle. In another example, a communication controller in operable combination with transceivers and a vehicle, may be in its entirety said to be embodied in a system. In yet another example, a plurality of vehicles with each vehicle including a communication controller in operable combination with transceivers and in communication with other vehicles, may be in its entirety said to be embodied in a system. Furthermore, aspects of the present embodiments of the disclosure may take the form of a computer program product embodied in one or more computer readable medium/media having computer readable program code embodied thereon.

Any combination of one or more computer readable medium/media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described above with reference to flowchart illustrations and/or block diagrams of methods, apparatus (systems) and computer program products according to embodiments of the present invention (e.g., FIGS. 7, 8, and 9). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the invention has been described in detail in connection with only a limited number of embodiments, it should be readily understood that the invention is not limited to such disclosed embodiments. Rather, the invention can be modified to incorporate a number of variations, alterations, substitutions, combinations or equivalent arrangements not heretofore described, but which are commensurate with the spirit and scope of the invention. For example, different types of light sources, detectors and vehicles for the communication system and method are within the scope of the present invention. Furthermore, the various components that make up the communication system, apparatus, and methods disclosed above can be alternatives which may be combined in various applicable and functioning combinations within the scope of the present invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

The invention claimed is:

1. A communication system for enabling communication between vehicles in a platoon whether such vehicles are arranged consecutively or non-consecutively, the system comprising:
    a first emitter and a first receiver, configured to be directed in a forward direction of a vehicle;
    a second emitter and a second receiver, configured to be directed in a backward direction of the vehicle; and
    a controller in communication with the emitters and the receivers, the controller configured to:
        during an initialization phase, determine a position of the vehicle within the platoon and the identity of each vehicle in the platoon, based on optical signals detected by the first and/or second receivers; and
        during a data transmission phase, participate in a token-based data transmission by evaluating an optical signal received by one of the first or second receivers and causing the emission of an optical signal either by the corresponding one of the first or second emitters that received the signal should the vehicle be the first or last vehicle in the platoon, or by the other one of the first or second emitters should the vehicle not be the first or last vehicle in the platoon;
    wherein the controller is further configured to, during the data transmission phase;
        if the vehicle is the first vehicle of the platoon, start the cyclical circulation of an optical control signal;
        if an optical control signal is received and no data transmission is required, forward the received control signal; and
        if an optical control signal is received and data transmission is required, generate and send a data-transmission signal including identification of a sender, a destination vehicle, payload data, and error correction data.

2. The system according to claim 1, wherein the controller is further configured to, during the initialization phase, determine whether the vehicle is the first or last vehicle in the platoon or not the first or last vehicle in the platoon, based on signals detected by the first and/or second receivers.

3. The system according to claim 1, wherein the controller is further configured to, during the initialization phase:
cause the first and second emitters to emit a signal;
if no signal is received from the forward direction, identify the vehicle to be the first vehicle of the platoon;
if no signal is received from the backward direction, identify the vehicle to be the last vehicle in the platoon; and
if signals are received from both the forward direction and the backward direction, identify the vehicle to be neither the first nor last vehicle of the platoon.

4. The system according to claim 1, wherein the controller is further configured to, during the initialization phase:
if the vehicle is the first vehicle of the platoon, generate a first signal comprising a vehicle identification and cause the first signal to be emitted in the backward direction;
if the vehicle is neither the first nor last vehicle of the platoon, generate a second signal by adding a vehicle identification to a signal received from the forward direction, cause the generated second signal to be emitted in the backward direction, and forward a signal received from the backward direction unchanged to be emitted in the forward direction; and
if the vehicle is the last vehicle of the platoon, generate a third signal by adding a vehicle identification to a signal received from a forward direction and cause the generated third signal to be emitted in a forward direction, the generated third signal including information about the sequence and identification of all vehicles in the platoon.

5. The system according to claim 1, wherein the controller is further configured to, during the initialization phase, determine the position of all vehicles in the platoon from the received signals.

6. The system according to claim 1, wherein the controller is further configured to, during the data transmission phase:
if the data-transmission signal is received and the vehicle does not have the destination vehicle identification, forward the received data-transmission signal;
if the data-transmission signal is received and the vehicle has the destination vehicle identification, generate and send a positive or negative data-transmission receipt signal to the sender, depending on whether the signal is received by the vehicle having the destination vehicle identification or not;
if a negative data-transmission receipt is received by the sender of the data- transmission signal, resend the data-transmission signal; and
if a positive data-transmission receipt is received by the sender of the data- transmission signal, start the circulation of a control signal.

7. The system according to claim 1, wherein the controller is further configured to, during the data transmission phase, and when checking if a data-transmission signal is received and a recipient vehicle does not have the destination vehicle identification, forward the received data-transmission signal in the direction where the vehicle having the destination vehicle identification is located with respect to the recipient vehicle.

8. The system according to claim 1, wherein the system further comprises a first plurality of emitters and receivers, configured to be integrated into headlights of the vehicle, and a second plurality of emitters and receivers, configured to be integrated into backlights of the vehicle.

9. The system according to claim 1, wherein the emitters include optical emitters, including one or more LEDs, and wherein the receivers include optical receivers, including one or more photodetectors.

10. The system according to claim 1, wherein the vehicle is selected from the group consisting of cars, trucks, tanks, boats, planes, and helicopters.

11. A method of communication vehicles in a platoon whether such vehicles are arranged consecutively or non-consecutively, the method comprising:
providing a first emitter and a first receiver directed in the forward direction of a vehicle;
providing a second emitter and a second receiver directed in the backward direction of the vehicle;
during an initialization phase, determining a position of the vehicle within the platoon and the identity of all vehicles in the platoon, based on optical signals detected by the first and/or second receivers; and
during a data transmission phase;
participating in a token-based data transmission by evaluating an optical signal received by one of the first or second receivers and causing the emission of an optical signal either by the corresponding one of the first or second emitters that received the signal should the determined position of the vehicle be the first or last vehicle in the platoon, or by the other one of the first or second emitters should the determined position of the vehicle not be the first or last vehicle in the platoon;
if the vehicle is the first vehicle of the platoon, starting the cyclical circulation of an optical control signal;
if an optical control signal is received and no data transmission is required, forwarding the received control signal; and
if an optical control signal is received and data transmission is required, generating and sending a data-transmission signal comprising identification of a sender, a destination vehicle identification, payload data, and error correction data.

12. The method according to claim 11, further comprising, during the initialization phase, determining whether the vehicle is the first or last vehicle in the platoon or not the first or last vehicle in the platoon, based on signals detected by the first and/or second receivers.

13. The method according to claim 11, further comprising, during the initialization phase:
emitting a signal from the first and second emitters;
if no signal is received from the forward direction, identifying the vehicle to be the first vehicle of the platoon;
if no signal is received from the backward direction, identifying the vehicle to be the last vehicle in the platoon; and
if signals are received from both the forward direction and the backward direction, identifying the vehicle to be neither the first nor last vehicle of the platoon.

14. The method according to claim 11, further comprising, during the initialization phase:
if the vehicle is the first vehicle of the platoon, generating a first signal comprising a vehicle identification and emitting the first signal in the backward direction;
if the vehicle is neither the first nor last vehicle of the platoon, generating a second signal by adding a vehicle identification to a signal received from the forward direction, emitting the generated second signal in the backward direction, and forwarding a signal received from the backward direction unchanged to be emitted in the forward direction; and if the vehicle is the last vehicle of the platoon, generating a third signal by adding a vehicle identification to a signal received from the forward direction and emitting the generated third signal in the forward direction, the generated third signal including information about the sequence and identification of all vehicles in the platoon.

15. The method according to claim 11, further comprising, during the initialization phase, determining the position of all vehicles in the platoon from the received signals.

16. The method according to claim 11, further comprising, during the data transmission phase:
- if a data-transmission signal is received and the vehicle does not have the destination vehicle identification, forwarding the received data-transmission signal;
- if a data-transmission signal is received and the vehicle has the destination vehicle identification, generating and sending a positive or negative data-transmission receipt signal to the sender, depending on whether the signal is received by the vehicle having the destination vehicle identification or not;
- if a negative data-transmission receipt is received by the sender of the data- transmission signal, re-sending the data-transmission signal; and
- if a positive data-transmission receipt is received by the sender of the data- transmission signal, starting the circulation of a control signal.

17. The method according to claim 11, further comprising, during the data transmission phase, and when checking if a data-transmission signal is received and a recipient vehicle does not have a destination vehicle identification, forwarding the received data- transmission signal in the direction where the vehicle having the destination vehicle identification is located with respect to the recipient vehicle.

18. The method according to claim 11, wherein the received or emitted signal is an optical radiation signal.

19. A method of communication between non-consecutive vehicles in a platoon, the method comprising:
- providing a first emitter and a first receiver directed in the forward direction of a vehicle;
- providing a second emitter and a second receiver directed in the backward direction of the vehicle;
- during an initialization phase, determining a position of the vehicle within the platoon and the identity of all vehicles in the platoon, based on optical signals detected by the first and/or second receivers; and
- during a data transmission phase:
  - participating in a token-based multi-hop data transmission by evaluating an optical signal received by one of the first or second receivers and causing the emission of an optical signal either by the corresponding one of the first or second emitters that received the signal should the determined position of the vehicle be the first or last vehicle in the platoon, or by the other one of the first or second emitters should the determined position of the vehicle not be the first or last vehicle in the platoon;
  - if the vehicle is the first vehicle of the platoon, starting the cyclical circulation of an optical control signal;
  - if an optical control signal is received and no data transmission is required, forwarding the received control signal; and
  - if an optical control signal is received and data transmission is required, generating and sending a data-transmission signal comprising identification of a sender, a destination vehicle identification, payload data, and error correction data.

* * * * *